(No Model.)
A. GRANDJEAN.
FILTER.
No. 571,474. Patented Nov. 17, 1896.
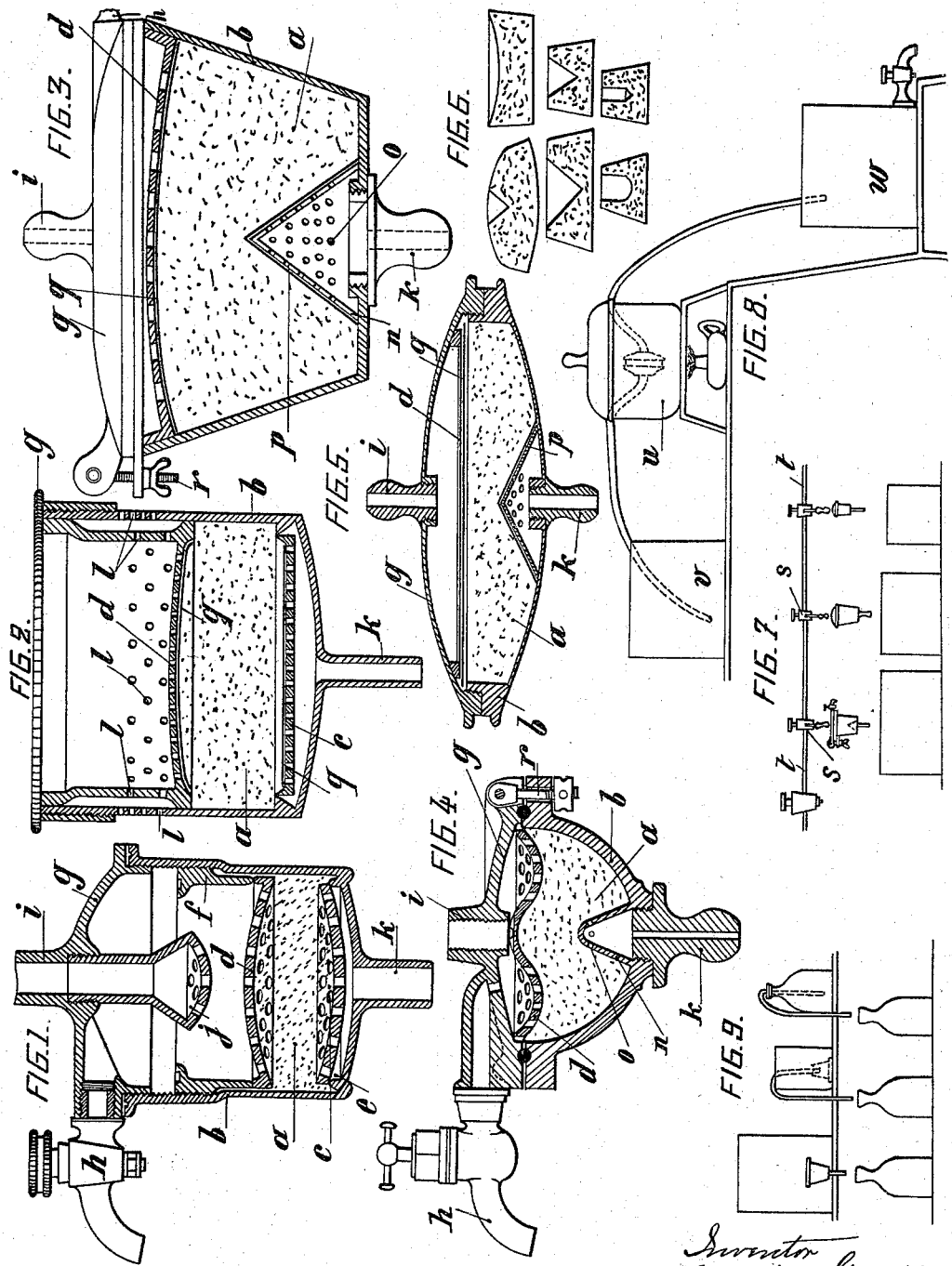
Witnesses:
L. M. Wachschlager,
George E. Morse.
Inventor
Albertine Grandjean,
By Briesen & Knauth
her Attorneys.

UNITED STATES PATENT OFFICE.

ALBERTINE GRANDJEAN, NÉE UNOLD, OF PARIS, FRANCE.

FILTER.

SPECIFICATION forming part of Letters Patent No. 571,474, dated November 17, 1896.

Application filed March 1, 1895. Serial No. 540,215. (No model.) Patented in Belgium June 1, 1894, No. 110,250, and in France October 8, 1894, No. 241,923.

*To all whom it may concern:*

Be it known that I, ALBERTINE GRANDJEAN, née UNOLD, of the city of Paris, France, have invented Improvements in Filters, (for which I have obtained Letters Patent in France for fifteen years, dated October 8, 1894, No. 241,923, and in Belgium for twenty years, dated June 1, 1894, No. 110,250,) of which the following is a full, clear, and exact description.

This invention relates to a new and improved filtering medium for liquids generally and to the construction of the filter in which it is employed. This new filtering medium is composed of defibrated paper-pulp compressed in the dry state into the form of blocks, as hereinafter described. The pulp is first defibrated in a dry state for the purpose of bringing it to as finely divided a condition as possible, the flocculent product thus obtained being then placed in molds and subjected to pressure in a hydraulic or other press, the degree of pressure applied varying according to the degree of homogeneousness required. In this manner dry compressed blocks of any desired form or dimensions are obtained. With the dry defibrated paper-pulp may be combined a mixture of carbon, sand, asbestos, alum, or other filtering substance capable of modifying the character of the filtrate. These filter-blocks may be contained in any suitable form of filter, but in order to insure an efficient result I have devised a special form whereby the filtrate is always drawn from the center of the filtering-block, so as to permeate through its every part and prevent leakage around the edges of the block.

Reference is to be had to the accompanying drawings, forming part of this specification, which illustrate several types of filter.

Figure 1 is a sectional elevation of a high-pressure filter. Fig. 2 is a section of a filter to be used where siphonic action is employed. Fig. 3 is a section of a filter adapted to work either under high pressure or under the pressure of a column of liquid or by siphoning. Fig. 4 is a section of a modified arrangement of the filter shown in Fig. 3. Fig. 5 is a section of a filter of small dimensions. Fig. 6 represents sections of different forms of filter-blocks. Figs. 7, 8, and 9 show the filters applied for various purposes.

The filter-block $a$ is inclosed in a casing $b$ of cylindrical, conical, or other form, preferably between two perforated disks $c\ d$, as shown in Figs. 1 and 2, the disk $c$ being interposed between the filter-block $a$ and the bottom of the casing, and may be supported upon a ring $e$, formed on the latter, as shown in Fig. 1, making a water-tight joint therewith, while the upper disk $d$ is pressed down upon the filter-block by a liner $f$, screwing into the casing $b$, as shown in Figs. 1 and 2, or otherwise. The casing is closed by any suitable screwed cover $g$, a tight joint being made by a rubber or other washer. The cover may have a cock $h$ for drawing off unfiltered or cleansing water, and connection $i$ for attachment to a supply-pipe within the cover in a rose $j$, and may terminate as shown in Fig. 1. The filtered water collects at the bottom of the apparatus and is discharged at the nozzle $k$. In Figs. 2, 3, 4, and 5 the perforated disk $d$ is held down upon the filter-block by the cover $g$.

The filter shown in Fig. 2 is intended to work by siphon action, the sides of casing $b$ and of the liner which holds down plate $d$ being perforated, as at 1, for the admission of the liquid to be filtered. The perforated disk $c$ may be replaced, as shown in Figs. 4 and 5, by a conical perforated dome $n$, rising from the bottom of the casing and covering the outlet $k$, the filter-block being suitably hollowed for its reception, so that the filtered liquid can only pass out at the center after traversing the filter-block and being freed from all impurities.

There may be applied upon the cone $n$ a cap $p$ of cloth, felt, or other fabric, molded or not in the cavity of the filter-block, for the purpose of preventing any fiber passing through the orifices $o$. The inner faces of the perforated disks $c\ d$ may also be lined with a layer of fabric $q$, as shown in Figs. 2, 3, and 5, for the protection of the filter-block when under considerable pressure of liquid, and prevent its disaggregation when water is injected for cleansing the filter. The cover $g$ may be pivoted to the casing $b$ by means of screw-bolts $r$ and nuts, as shown in Figs. 3 and 4.

My improved filter may be made of all dimensions, and when to be employed for filtering small quantities at a time it may be arranged as shown in Fig. 5.

The filter-blocks may be made of various forms, as shown in Fig. 6, adapted to suit filters of various shapes, and the latter may be made of metal or other suitable material.

In Fig. 7 the filter is shown as applied directly to the draw-off taps $s$ on a supply-pipe $t$.

The filter may also be placed in a heater or cooler $u$, Fig. 8, so that the liquid transferred from vessel $v$ to vessel $w$ may be heated or cooled at same time as it is filtered. The filter is, moreover, capable of being adapted to the vessel containing the liquid to be filtered, so as to act under the pressure of a column of liquid, or of being immersed in the liquid to be filtered, as shown in Fig. 9, or of being placed at a distance therefrom, in the two latter cases the liquid being drawn through the filter by siphon action.

It will be observed that in all of the forms of filters shown perforated plates are located on opposite sides of the filtering-block to clamp and hold the same in place. In some instances these perforated plates are of the form represented at $q$ in Fig. 2, while in other instances they are of the form represented at $p$ in Fig. 5, and I do not limit myself to the particular form of the plates employed.

The following are the advantages of the filter:

First. The filtering material being composed of pure cellulose is completely exempt from foreign matters.

Second. The filter is so constructed and arranged as to enable it to be thoroughly washed.

Third. The filter-block having been compressed in a dry state to the exact form of the casing will expand on being moistened, the increase in bulk insuring a perfectly tight joint between the filter-block and casing.

Fourth. The filtering medium being cheap can be frequently replaced, thus avoiding the danger of other filters made of porous material, such as porcelain, carbon, sandstone, &c., which, owing to their great porosity, allow of the passage of bacteria or become by degrees incrusted therewith.

I am aware that it has been proposed to employ as a filtering medium blocks made from pulp defibrated in a wet state and wherein the separate particles are woven together. This has been found to be objectionable, and I make no claim to such herein, but What I do claim, and desire to secure by Letters Patent, is—

1. As a new article of manufacture, a filtering medium composed of flocculent pulp defibrated and compressed in a dry state into the form of a block, as specified.

2. A filter having a filtering medium of paper-pulp defibrated in the dry state and compressed in such dry state in the form of a block, said block being clamped and held between two perforated plates located on opposite sides of such block, one of said plates being connected with a liquid-inlet in the containing-casing and the other of said plates being connected with a liquid-outlet in the containing-casing, all substantially as hereinbefore described and illustrated in the drawings for the purpose specified.

The foregoing specification of my improvements in filters signed by me this 8th day of February, 1895.

ALBERTINE GRANDJEAN, NÉE UNOLD.

Witnesses:
CLYDE SHROPSHIRE,
ALBERT MOREAU.